United States Patent [19]
Miyashita et al.

[11] 4,456,736
[45] Jun. 26, 1984

[54] METHOD OF MANUFACTURING GRAFT COPOLYMERS COMPRISING POLYPHENYLENE ETHER

[75] Inventors: Shunitsu Miyashita; Masaaki Azuma, both of Kobe; Akiyoshi Somemiya, Akashi, all of Japan

[73] Assignee: Kanegafuchi Kagaku Kogyo Kabushiki Kaisha, Osaka, Japan

[21] Appl. No.: 335,684

[22] Filed: Dec. 30, 1981

Related U.S. Application Data

[63] Continuation of Ser. No. 181,110, Aug. 25, 1980, abandoned.

[30] Foreign Application Priority Data

Aug. 30, 1979 [JP] Japan .................................. 54-111177

[51] Int. Cl.$^3$ ............................................ C08F 233/08
[52] U.S. Cl. .................................... 525/392; 525/391; 525/397
[58] Field of Search ......................... 525/391, 392, 397

[56] References Cited

U.S. PATENT DOCUMENTS 3,384,682  5/1968  Erchak, Jr. et al. ................. 525/391
3,929,930  12/1975  Izawa et al. .......................... 525/391
4,132,684  4/1979  Izawa et al. .......................... 525/391

OTHER PUBLICATIONS

Hack's Chemical Dictionary, (4th Ed.), (1969), p. 642, McGraw Hill, New York.

Primary Examiner—J. Ziegler
Attorney, Agent, or Firm—Moonray Kojima

[57] ABSTRACT

A method is provided wherein graft copolymers of polyphenylene with styrene and/or other vinylic monomers are readily prepared in high yields of grafting efficiency by radical polymerization of vaporized monomer onto solid polyphenylene ether. The resulting graft copolymer has improved properties, such as fracture strength, and chemical resistance.

17 Claims, No Drawings

METHOD OF MANUFACTURING GRAFT COPOLYMERS COMPRISING POLYPHENYLENE ETHER

This a continuation of application Ser. No. 181,110 filed Aug. 25, 1980. now abandoned.

BACKGROUND OF THE INVENTION

This invention relates to a method of manufacturing denatured polyphenylene ether, and more particularly to such a method involving a gas phase graft polymerization of polyphenylene ether.

Polyphenylene ether has a comparatively high softening point and belongs to a class of thermoplastic resins which are effectively used in fields requiring thermal resistance. However, polyphenylene ether is insufficient in its impact resistance and workability to be utilizable for certain uses.

A variety of methods have been proposed to improve the above mentioned disadvantages. For example, as to impact resistance, a method of denaturing polyphenylene ether by use of a rubber, has been proposed. For example, a method proposed in Japan Patent Publication Nos. 1482/1968 and 32730/1972, mechanically add rubber into polyphenylene ether in their molten state. In another method disclosed in Japan Patent Publication No. 47389/1978, polyphenylene ether and polybutadiene were first dissolved in a conventional solvent, in which they were both soluble. Then, the resulting solution was added a little at a time into another conventional solvent, in which both were substantially insoluble, thereby causing the two components to precipitate out as homogeneously mixed micro particles. However, disadvantageously, these prior methods only employ blending processes. Considered from an industrial viewpoint, and from the viewpoint of compatibility of rubber to polyphenylene ether, it cannot be said that the properties of rubber are sufficiently utilized.

In order to improve this deficiency, Japan Patent Laid-Open Document No. 9098/1977, employs a method wherein rubber-denatured polyphenylene ether, in which rubber is chemically combined to polyphenylene ether, may be obtained by polymerizing phenol according to an oxidizing coupling reaction in the presence of a reaction product between phenol and rubber. Denatured polyphenylene ether obtained according to this method shows an improvement in its elongation, impact resistance and fatigue resistance. However, disadvantageously, this prior method is complicated in the reaction process and the refining process because it requires reaction between rubber and phenol on a Friedel-Crafts catalyzer.

On the other hand, a method wherein resin having excellent fluidity, is blended or a method wherein low molecular additives are added, may be used as a rule, to improve the workability. However, disadvantageously, in some cases, the latter method leads to leakage of the additives from the resin to stain the surface of the molded products. Also, disadvantageously, the method sometimes lowers the mechanical properties of the resin. An example of this method is Japan Patent Publication No. 17812/1968 which discloses a method wherein polystyrene having excellent compatibility with polyphenylene ether is used to improve workability by blending a resin having an excellent fluidity. Also, Japan Patent Laid-Open Document No. 126800/1975 discloses a method wherein styrene monomer containing compounds which are polymerizable according to a free radical mechanism, are grafted onto polyphenylene ether.

In general, copolymers obtained by merely blending different kinds of resins are remarkably different from polymers obtained by grafting, especially in mechanical properties. The latter is superior to the former. The method disclosed in Japan Patent Laid Open Document No. 126800/1975 employs compounds, which are polymerizable in accordance with a free radical mechanism, at a temperature within the range of from 100° to 200° C., and which are graft polymerized to a polyphenylene ether in the presence of a radical initiator, to obtain a graft copolymer which contains no polyphenylene ether homopolymer (according to the Document). The copolymer obtained according to the method, has in a practical manner, improved certain properties, such as workability or thermal resistance. However, disadvantageously, this method readily causes adverse by-reactions because polymerization is performed at a comparatively high temperature of 100° C. or higher. Most of the compounds which are polymerizable in accordance with the free radical mechanism, can be polymerized at a comparatively high temperature. Also, it difficult to obtain graft copolymers having a large polymerization degree of grafting branches. Moreover, sufficient chain transfer onto polyphenylene ether is difficult to obtain at a polymerization temperature of 100° C. or less; that is to say, grafting efficiency is lowered. Thus, it is desired to develope a grafting method which shows a high grafting efficiency, and at a comparatively low temperatures.

Japan Patent Publication No. 41383/1971 discloses a method wherein polyphenylene ether is denatured by graft copolymerizing certain compounds to polyphenylene ether. According to this method, polyphenylene ether is replaced by alkali metals and then grafted by an anion polymerization. This prior method is not an industrially useful method of manufacture because it includes ion polymerization and the graft polymerization is adverseley influenced by water, oxygen and impurities contained in the polymerization system.

SUMMARY OF THE INVENTION

An object of the invention is to eliminate the aforementioned and other deficiencies and disadvantages of the prior art.

Another object is to provide a method for producing a polyphenylene ether graft copolymer which has improved properties, such as impact resistance, workability, fracture strength and chemical resistance.

A further object is to provide an industrially utilizable method for producing a polyphenylene ether graft copolymer having superior grafting efficiency and high degree of grafting, at comparatively low temperatures.

Another object is to provide a denatured polyphenylene ether copolymer containing at most only a small amount of free polystyrene.

The foregoing and other objects of the invention are attained by graft polymerizing compounds which are polymerized using the free radical mechanism, and which are in the gas phase, to polyphenylene ether, in the presence of radical polymerization initiators, which act effectively at the grafting polymerization temperature. According to the invention, graft copolymers can be obtained with high grafting efficiency as well as high degree of grafting, even when comparatively low temperatures are employed. The obtained denatured polyphenylene ether contains, at most, only a small amount of free polystyrene, and thus has remarkably improved properties, such as resistance to stress cracking, tensile strength, fracture or yield strength and chemical resistance, such as oil resistivity due to the high grafting efficiency.

In the invention, polyphenylene ether is graft polymerized with 5 to 95 weight parts of at least one radical polymerizable compound, in the presence of 0.2 to 30 weight parts of a radical initiator, with the weight parts being based on 100 weight parts of the graft copolymer produced by the method, and wherein the at least one radical polymerizable compound has a vapor pressure of 50 mmHg or more, and the polymerization is carried out at a temperature of between 20° to 150° C., and the molecular weight of the polyphenylene ether is between 1,200 and 200,000. The degree of polymerization of the compound onto the solid polyphenylene ether is at least 10% or more.

A feature of the invention is the graft polymerization of a radical polymerizable compound in the gaseous phase unto a solid phase polyphenylene ether, in the presence of a radical initiator.

Another feature of the invention is the vapor pressure of the radical polymerizable compound being preferably 5 mmHg or more and more preferably 100 mmHg or more.

A further feature is the use of preferably 5 to 95 weight parts and more preferably 10 to 75 weight parts, per 100 parts of the graft copolymer, of the radical polymerizable compound, which is graft polymerized with the polyphenylene ether.

Another feature is the use of a radical initiator preferably in an amount of from 0.2 to 30 weight parts, and more preferably 0.5 to 20 weight parts, per 100 parts of the graft copolymer.

A further feature is the polyphenylene ether preferably having molecular weight of 1,200 to 200,000, more preferably 3,000 to 100,000 and most preferably 9,600 to 70,000.

Another feature is the radical polymerization compound is selected from the group consisting of aromatic vinyl compound, alkyl acrylate, alkyl methacrylate, acrylonitrile, methacrylonitrile, carboxylic acid, butadiene and mixtures thereof.

Another feature is the polymerization temperature being preferably 20° to 150° C., more preferably 50° to 130° C., and most preferably 60° to 100° C.

A further feature is the degree of polymerization of the compound onto the polyphenylene ether being preferably 10% or more, and more preferably 25% or more.

DETAILED DESCRIPTION OF THE PREFERRED EMBODIMENTS

According to the present invention, graft copolymers having high molecular grafting branches, can be obtained. The molecular weight of the grafted portion can be freely changed over a wide range to low molecular weights by selecting the reaction conditions. Furthermore, the method of the instant invention is simple and industrially applicable because this polymerization method adds radical polymerization initiators to solid polyphenylene ether resin, and introduces in a gaseous form, compounds polymerizable employing a free radical mechanism.

More particularly, the instant invention relates to a method of manufacturing graft copolymers by a graft polymerization of substantially solid polyphenylene ether which is previously blended with an organic or inorgnic radical initiator, with at least one compound which is polymerizable employing the free radical mechanism (referred to as monomers hereinafter) under conditions wherein at least one monomer exists in a gaseous form.

The polyphenylene ether used in the instant invention has a repeating unit which is defined by the following formula:

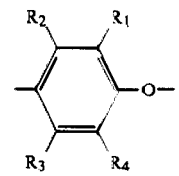

wherein $R_1$, $R_2$, $R_3$ and $R_4$ may be hydrogen, hydrocarbon groups, substituted hydrocarbon groups, halogen, hydrocarbon oxylic groups or substituted hydrocarbon oxylic groups or amino groups, or substituted amino groups. The polyphenylene ether employed in the instant invention includes poly(2,6-dimethylphenylene-1,4-ether); poly(2,6-diethylphenylene-1,4-ether); poly(2-methyl-6-allyl-phenylene-1,4-ether); poly(2,6-dipropylphenylene-1,4-ether); poly(2,6-dimethoxyphenylene-1,4-ether); poly(2-methyl-6-chlorphenylene-1,4-ether); poly(2,6-dichlormethylphenylene-1,4-ether); poly(2-methyl-6-bromophenylene-1,4-ether); poly(2,5-dimethylphenylene-1,4-ether); poly(2,6-phenylphenylene-1,4-ether) or copolymers thereof. The polyphenylene ether preferably has a molecular weight ($M_n$) of from 1,200 to 200,000, more preferably from 3,000 to 100,000, and most preferably from 9,600 to 70,000 [corresponding to ($\eta$) (in chloroform at 25° C.) of from 0.07 to 2.8, from 0.13 to 1.7, and from 0.30 to 1.3, respectively.].

The polymerization degree "n" preferably should be an integer of 10 or more, and more preferably 25 or more. Graft polymerization becomes difficult with a decrease of "n" in the graft polymerization of polyphenylene ether using a radical mechanism by way of compounds which dissolved polyphenylene ether, such as disclosed in Japan Patent Publication No. 47862/1972 and Japan Patent Laid Open Document 126800/1975. This especially has a tendency to occur when the index "n" is 60 or less.

Advantageously, in the instant invention, the behavior of graft copolymerization is not substantially influenced by the number "n" if "n" is 10 or more. It appears that use of solvents leads to easily movable ends of polyphenylene ether. Graft polymerization is hindered by the ends of the polyphenylene ether when the number of ends is great.

Polyphenylene ether may be used in the form of powder, bead or pellets in the instant invention. Polyphenylene ether is preferably used in a form of powder having a large porosity, in particular, in cases where high degree of denaturing is required.

Organic or inorganic radical initiators used in conventional racial polymerization processes, may be used as the radical polymerization initiators in the present invention. They include t-butylhydroperoxide, cumene hydroperoxide, methylethylketone peroxide, di-t-butyl peroxide, dicuml peroxide, acetyl peroxide, lauroyl peroxide, benzoyl peroxide, t-butylperoxyacetate, t-butyl peroxybenzoate, alpha, alpha'-azobis-isobutylonitrile, potassium persulfate, ammonium persulfate and the like. Two or more of the foregoing may be used in combination with each other. The radical polymerization initiators are used preferably in a ratio of from 0.2 to 30 weight parts, preferably from 0.5 to 20 weight parts, based on the graft copolymer being 100 weight parts. The parts and other units herein are in terms of weight unless otherwise specified. Also, the weight parts are in terms of 100 weight parts of the produced graft copolymer. The graft polymerization is not sufficient in its progress and consequently the desired polymers cannot be obtained if the radical initiators are used in a ratio less than 0.2 weight parts. On the other hand, economy and denaturing efficiency are slightly lowered if the stated ratio exceeds 20 weight parts. It is desirable to employ radical polymerization initiators in amounts toward the lower part of the range.

According to the instant invention, the graft polymerization is not influenced much by the hindering action of the ends of the polyphenylene ether. Consequently, advantageously, one may use lesser amounts of radical initiators than used in known techniques for radical graft polymerization which are effected in solvents.

Although the radical polymerization initiators may be added to polyphenylene ether merely by stirring, it is preferable to first obtain a solution by dissolving the radical polymerization initiator in a solvent in which the radical polymerization initiator is soluble, but in which polyphenylene ether is not soluble. Then, the solution is added to polyphenylene ether, and then removing the solvent as far as the radical polymerization initiator maintains its substantial activity.

The radical polymerizable compounds, which are polymerizable employing radical mechanism, are monomers containing at least one ethylenically unsaturated double bond and having one to 15 carbon atoms. The preferred compounds are selected from the group consisting of aromatic vinyl compound, alkyl acrylate, alkyl methacrylate, acrylonitrile, methacrylonitrile, vinyl carboxylic acid, butadiene and mixtures thereof. The alkyl acrylate and methacrylate have 1 to 8 carbon atoms of the alkyl group.

The monomers employed in the invention may include vinyl chloride, vinylidene chloride, vinyl acetate, styrene, alpha-methylstyrene,2,4-dimethylstyrene, p-chlorostyrene, acrylonitrile, alphamethacrylonitrile, acrylic acid, methylacrylate, ethyl acrylate, butyl acrylate, methyl methacrylate, ethyl methacrylate, 1,3-butadiene, isoprene, chloroprene, ethylene, propylene, 1-butene, vinyl naphthalene, maleic anhydride, N-vinylcarbazol, and the like.

Particularly preferred are styrene, alpha-methylstyrene, 2,4-dimethylstyrene, p-chlorostyrene, acrylonitrile, alpha-methacrylonitrile, acrylic acid, methyl acrylate, ethyl acrylate, butyl acrylate, methyl methacrylate, ethyl methacrylate, 1,3-butadiene, maleic anhydride, and the like.

The foregoing compounds and monomers may be used in combination of two or more. In some cases there was at least vinyl aromatic content of 5%.

At least one of these compounds in a gaseous phase is graft copolymerized with the polyphenylene ether which is in a solid phase. The velocity of polymerization is low when the above mentioned compounds have lower vapor pressures. Although graft polymerization is possible as far as the compounds have vapor pressures, from an industrial viewpoint, at least one monomer should have a vapor pressure preferably of 50 mmHg or more, and more preferably 100 mmHg or more.

From viewpoint of manufacturing and properties of the product, in general, it is advantageous to use the monomers so that the obtained polymers may contain the grafted radical compounds in amount preferably of from 5 to 95 weight parts, more preferably from 10 to 90 weight parts, and most preferably 10 to 75 weight parts, based on 100 weight parts of the graft copolymer product.

A variety of different polymerization methods may be employed, such as batch type circulation type and the like.

The graft polymerization may be carried out preferably at a temperature within the range of from 20° to 150° C., more preferably 50° to 130° C. and most preferably from 60° to 100° C. By-reactions may be generated in some cases when the polymerization reaction is carried out at comparatively higher temperatures consistent with the kind of compounds polymerizable employing the radical mechanism. The polymerization temperature is selected by considering the conditions producing the desired graft polymers, such as the vapor pressure of the monomers used, the decomposing temperature of the radical initiator, and the like.

The present invention relates to graft polymerization of substantially solid phase polyphenylene ether with the aformentioned monomers in a gaseous phase.

Any suitable solvent may be employed, such as, for example, benzene, ethyl benzene, toluene, xylene, carbon tetrachloride or chloroform. These solvents are selected so as not to hinder the radical polymerization. They may be used in a ratio of from 0 to 10 weight parts based on 100 weight parts of the graft copolymer. Their use may lead to accelerated graft polymerization, but is not harmful. Such solvents could easily be selected considering the catalyzers, the monomers employed, and the graft copolymer desired to be produced. Polyphenylene ether powders which do not adhere mutually before soaking, may be soaked with solvents, such as toluene, in the mentioned amounts, in a gaseous form. Substantially solid polyphenylene ether powders not adhering mutually can also be obtained when the solvents are added to polyphenylene ether powders by means of a mixer.

Although the degree of polymerization of grafting branches can be adjusted by such factors as amount of radical polymerization initiators, polymerization temperature, and the like, it may also be adjusted by employing conventional chain transfer agents. Such chain transfer agents may include mercaptane, alcohol and the like.

To recapitulate, the present invention relates to a method of manufacturing graft copolymers, characterized by graft polymerization of substantially solid polyphenylene ether with compounds polymerizable using a radical mechanism, at temperatures where the compounds exist in a gaseous form. Polyphenylene ether can be easily and effectively denatured over a wide industrial range. Thus, the instant invention is highly advantageously from a commercial and industrial viewpoint.

The invention will be more fully set forth in the following actual examples, which examples are not to be construed in any limiting sense.

REFERENCE EXAMPLE 1

A mixture of poly-2,6-dimethylphenylene-1,4-ether having ($\eta$) of 0.48 (in chloroform at 25° C.) in an amount of 50 g and ethyl benzene in an amount of 50 g, contained in a separable flask having a volume of 500 ml, and provided with a thermometer, a condenser, a nitrogen-supplying pipe, and a sealed stirrer, was heated to melt on an oil bath having a temperature adjusted to 120° C. Then, nitrogen gas was passed through the separable flask to replace air in the flask with nitrogen gas. After addition of di-t-butyl peroxide in an amount of 4 g, the mixture was heated at 120° C. for 2 hours with stirring. Then, styrene in an amount of 80 g was added to the reaction mixture. The reaction mixture was heated at 130° C. for 2 hours with stirring. After the completion of polymerization, the reaction mixture was taken out from the flask and chloroform in an amount of 100 times the reaction mixture by weight, was added. Then, the mixture was stirred for 4 hours at room temperature. A small amount of insoluble portions was found and was not treated further. Methanol in an amount of 5 times the chloroform by weight, was added drop by drop and a precipitate was removed. Then, the precipitate was dried in vacuum for 3 hours at 160° C. to obtain a polymer. The polystyrene content of this polymer was 52% by weight.

This obtained copolymer in an amount of 3.00 g was extracted by using methylethylketone in a Soxley's extractor to separate free polystyrene. Free polystyrene are polymers of styrene which are not graft copolymerized to poly-2,6-dimethylphenylene-1,4-ether. Free polystyrene in an amount of 0.81 g was extracted. The results obtained are as follows:

Grafting degree—51.8%;
Grafting efficiency—48.0%,
Grafting degree and grafting efficiency were calculated using the following formula, respectively:

$$\text{Grafting degree} = \frac{\text{(the amount of polystyrene grafted)}}{\text{(amount of poly-2,6-dimethylphenylene-1, 4-ether)}} \times 100$$

$$\text{Grafting efficiency} = \frac{\text{(amount of polystyrene grafted)}}{\text{(amount of polystyrene polymerized)}} \times 100$$

This polymer in an amount of 2.00 was dissolved in methylene chloride in an amount of 40 ml. The solution was left standing at 23° C. The precipitation was observed after 24 hours. After filtering and drying, a precipitate in an amount of 1.34 g was obtained. The absorption of polystyrene was found in an infrared absorption of this precipitate.

REFERENCE EXAMPLE 2

An autoclave having 300 ml capacity and containing a mixture of poly-2,6-dimetylphenylene-1,4-ether having ($\eta$) of 0.48 (in chloroform at 25° C.) in an amount of 100 g and ethyl benzene in an amount of 60 g, was deairated by means of a vacuum pump and then heated to melt the mixture with stirring. Then, di-t-butyl peroxide in an amount of 4 g and styrene in an amount of 40 g were added and further mixed. The mixture was heated at 165° C. for 2 hours. After completion of the reaction, the reaction mixture was removed from the autoclave, and was dissolved in chloroform in an amount of 100 times the reaction mixture by weight. A small amount of insoluble portions was found and not treated further. Methanol was added and a polymer was obtained in a form of a precipitate. The precipitate was dried, as in reference example 1. The polymerized styrene content of the obtained polymer was 27%. The free polystyrene content was measured in the same way as in reference example 1.

The free polystyrene content was 14.7% by weight based on the graft polymer being 100%. The results were as follows:
Grafting degree was 16.9%
Grafting efficiency was 54.3%.

This polymer was dissoled in methylene chloride using the same conditions as in the reference example 1, and sedimentation was observed. A sediment in an amount of 1.65 g was found after 48 hours. The absorption of polystyrene was found in an infrared absorption spectrum of this precipitate.

The results of tests carried out on the reference example and example 10 specimen are shown in Table 1 set forth hereinbelow.

TABLE 1

|  | Reference Example 1 | Example 10 |
|---|---|---|
| Fracture Strength (Kg/cm$^2$) | 723 | 366 |

Note:
Measurements were carried out according to ASTM D638

Table 1 shows the fracture strength of molded products made by pressing samples obtained in Reference Example 1 and Example 10 which will be described hereinafter. Polystyrene (ESTYRENE G-20 manufactured by Nippon Steel Chemical Co, Ltd) was added to the polymer obtained in Example 10 in order to obtain the same polystyrene content.

EXAMPLE 1 THROUGH 5

Acetone in an amount of about 30 ml in which radical polymerization initiators are dissolved, were added to poly-2,6-dimethylphenylene-1,4-ether powder in an amount of 2.00 grams (30 mesh) and then the mixture was stirred. Acetone was completely removed from the mixture at 50° C. A reaction tube made of glass and having an inside diameter of 12 mm and a length of 150 mm and containing poly-2,6-dimethylphenylene-1,4-ether, in which said radical initiator was absorbed, was immersed in an oil bath adjusted to the polymerization temperature. The contents of the reaction vessel was thus substantially uniformly heated to that polymerization temperature. Styrene vapors was introduced in the reaction tube through its inlet while the reaction tube was deairated from its outlet by means of a vacuum pump. The same temperature as the polymerization temperature was provided to styrene vapour previously. The polymerization was continued for 5 hours.

After the polymerization, the reaction product was washed with methanol sufficiently and then dried in vacuum at 160° C. for 4 hours. Polystyrene content, grafting degree and grafting efficiency were determined in the same way as in Reference Example 1 for the obtained copolymer. Table 2 shows the results obtained udner various conditions of kinds and amounts of radical polymerization initiators, polymerization temperatures and molecular weights of poly-2,6-dimethylphenylene-1,4-ether (represented by ($\eta$)) were employed.

EXAMPLE 6

The treatment was carried out in the same way as in Example 1, except that butyl acrylate was used instead of styrene and the polymerization was continued for 6 hours. Polyacrylic acid content, grafting degree and grafting efficiency were 17.9%, 18.6% respectively. No precipitation from the methylene chloride solution was found after 48 hours.

EXAMPLE 7

1,3-butadiene was used instead of styrene was used in Example 1. After deairation, 1,3-butadiene was introduced into the reaction tube and a pressure of 1.5 kg/cm$^2$ was maintained inside of the reaction tube. The observation of precipitation from the methylene chloride solution was taken for toluene soluble portions because toluene insoluble portions were contained in the polymer obtained in a ratio of 51%. Also, the polybutadiene content was determined not by an infrared spectroanalysis but by elementary analysis of C, H and O. The polybutadiene content of the polymer obtained was 11.4%. The sedimentation from the methylene chloride solution was not found after 48 hours.

bottom portion and poly-2, 6-dimethylphenyl-1, 4-ether having ($\eta$) of 0.44 (in chloroform at 25° C.) in which radical polymerization initiators were absorbed (in the same way as in Example 1) and which was placed over styrene so that they would not contact each other, was deairated and then nitrogen gas was introduced in the autoclave so that the pressure inside the autoclave could be higher than the vapor pressure of monomers by 100 mmHg at the polymerization temperature. Then, the autoclave was immersed in oil bath adjusted to the polymerization temperature for 5 hours to carry out the polymerization. After the polymerization reaction, the reaction product was cooled to room temperature and then the upper reaction mixture was taken out. This upper reaction mixture was washed by methanol sufficiently and then dried in vacuum at 160° C. for 4 hours. The determination of polystyrene content, grafting degree and grafting efficiency and the observation of sedimentation from the methylene chloride solution were in accordance with the procedures set forth in Reference Example 1.

Table 3 shows the results obtained under conditions of varying kinds, and amounts of radical polymerization initiators and polymerization temperatures.

TABLE 2

| Ex. | Radical polymerization Initiator | amount initiator (wt %) | Polymerization Temp (°C.) | ($\eta$) (in chloroform at 25° C.) of poly-2,6-dimethylphenylene-1 4-ether | Styrene content of resulting copolymer (%) | Grafting degree of styrene (%) | Grafting efficiency of Styrene (%) | Sedimentation from methylene chloride solution |
|---|---|---|---|---|---|---|---|---|
| 1 | Benzoyl peroxide | 5 | 65 | 0.72 | 21.5 | 23.6 | 86.2 | not found after 48 hrs. |
| 2 | Benzoyl peroxide | 5 | 110 | 0.44 | 27.5 | 31.7 | 83.7 | not found after 48 hrs. |
| 3 | t-butyl peroxybenzoate | 4 | 110 | 0.44 | 30.5 | 35.5 | 81.0 | not found after 48 hrs. |
| 4 | t-butyl peroxybenzoate | 8 | 120 | 0.44 | 27.9 | 32.2 | 83.1 | not found after 48 hrs. |
| 5 | Di-t-butyl peroxide | 5 | 130 | 0.44 | 29.7 | 36.1 | 85.5 | not found after 48 hrs. |

EXAMPLES 8 THROUGH 14

From the inside of an autoclave having an inside capacity of 150 ml and containing styrene 5 ml in its

TABLE 3

| Ex. | Radical polymerization initiator | amount of initiator (wt %) | Polymerization temp. (°C.) | Styrene content of resulting copolymer (%) | Grafting degree of styrene (%) | Grafting efficiency of styrene (%) | Sedimentation from methylene chloride solution |
|---|---|---|---|---|---|---|---|
| 8 | Benzoyl peroxide | 5 | 90 | 25.9 | 30.3 | 86.5 | not found after 48 hours |
| 9 | t-butyl peroxybenzoate | 4 | 110 | 26.2 | 28.7 | 80.9 | not found after 48 hours |
| 10 | t-butyl peroxybenzoate | 4 | 130 | 25.9 | 30.5 | 87.3 | not found after 48 hours |
| 11 | t-butyl peroxybenzoate | 1 | 130 | 29.7 | 37.3 | 88.3 | not found after 48 hours |
| 12 | D-t-butyl peroxide | 3 | 130 | 27.0 | 32.3 | 87.2 | not found after 48 hours |
| 13 | Di-cumyl peroxide | 5 | 110 | 25.5 | 27.6 | 80.5 | not found after 48 hours |
| 14 | Di-cumyl peroxide | 10 | 110 | 23.7 | 25.8 | 83.2 | not found after |

TABLE 3-continued

| Ex. | Radical polymerization initiator | amount of initiator (wt %) | Polymerization temp. (°C.) | Styrene content of resulting copolymer (%) | Grafting degree of styrene (%) | Grafting efficiency of styrene (%) | Sedimentation from methylene chloride solution |
|---|---|---|---|---|---|---|---|
| | | | | | | | 48 hours |

EXAMPLE 15

The treatment was carried out in the same way as in Example 8 except acrylonitrile was used instead of styrene monomer and the polymerization temperature was 75° C. Dimethylformamide (DMF) in an amount of 50 times the reaction mixture was added to the reaction mixture and then the mixture was heated at 80° C. for 1 hours with stirring to remove free polyacrylonitrile. Free polyacrylonitrile was polyacrylonitrile which was not graft copolymerized to poly-2,6-dimethylphenylene-1,4-ether, and was insoluble to DMF. Free polyacrylonitrile in an amount of 0.05 g was separated. The results of an analysis for the copolymer obtained were as follows:

Acrylonitrile content—36.3% by weight.
Grafting degree of acrylonitrile—56.9%.
Grafting efficiency of acrylonitrile—99.5%.

The copolymer obtained, from which free polyacrylonitrile was removed, is insoluble to methylene chloride and consequently sedimentation from the methylene chloride solution was impossible. Thus, the polymer obtained was extracted from chloroform in a Soxley's extractor. Chloroform soluble portions were obtained in a ratio of 0.8% by weight. As a result of analysis, the chloroform soluble portion contained acrylonitrile in a ratio of 4.3% by weight. Thus, free poly-2,6-dimethylphenylene-1,4-ether was contained in a ratio of 0.7% by weight or less.

EXAMPLE 16

The treatment was carried out in the same was as in Example 10, except a mixture comprising styrene in an amount of 4 grams and acrylonitrile in an amount of 1 g, was used instead of styrene.

The results were as follows:
Rate of increase in weight—30.5% by weight,
Grafting Degree—25.5%,
Grafting efficiency—83.6%,
Acrylonitrile content of grafting branches—10.5%,
Sedimentation from methylene chloride solution—not found ater 48 hrs.

EXAMPLE 17

The treatment was carried out in the same way as in Example 10, except methyl methacrylate (MMA) was used instead of styrene. The results were as follows:
Poly methyl methacrylate content—32.5% by weight,
Grafting Degree—48.1%,
Grafting Efficiency—82.1%,
Sedimentation from methylene chloride solution—not found after 48 hrs.

EXAMPLE 18

The treatment was carried out in the same way as in Example 10, except a copolymer having (η) of 0.45 (in chloroform at 25° C.) and 2,6-diethyl-phenyl content of 55%, which was obtained from a mixture of 2,5-dimethylphenol and 2,6-diethylphenol, by the oxidation coupling copolymerization process, was used instead of poly-2,6-dimethylphenylene-1,4-ether. The results were as follows:

Styrene content—25.6% by weight,
Grafting Degree—30.1%,
Grafting efficiency—87.6%,
Sedimentation from methylene chloride solution—not found after 48 hrs.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A metho of producing a graft copolymer from solid phase polyphenylene ether and gaseous phase radical polymerizable compound, comprising the steps of dissolving a radical polymerization initiator in an acetone solvent;
adding said solvent having said initiator dissolved therein to said solid phase polyphenylene ether;
removing said solvent from the resulting mixture of said initiator, solvent and polyphenylene ether;
placing the resulting polyphenylene ether and initiator, wherein said initiator was absorbed in said polyphenylene ether, into a reactor;
adjusting said reactor to a polymerization temperature;
providing said gaseous phase radical polymerizable compound with said polymerization temperature;
introducing said gaseous phase radical polymerizable compound at said polymerization temperature to said reactor;
whereby said radical polymerizable compound in gaseous phase is graft polymerized with said solid phase polyphenylene ether; and
wherein said radical polymerizable compound has a vapour pressure of not less than 50 mm Hg;
wherein said polyphenylene ether is in the form of powder, beads or pellets; and
wherein said polyphenylene ether has repeating units with the following formula:

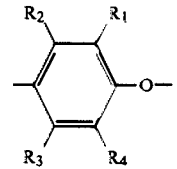

wherein $R_1$, $R_2$, $R_3$ and $R_4$ are monovalent substituent selected from the group consisting of hydrogen, halogen, hydrocarbon radical, substituted hydrocarbon group, hydrocarbonoxy radical, substituted hydrocarbonoxy radical, amino radical and substituted amino group;

and wherein said radical polymerizable compound is used in an amount of 5 to 95 weight parts, said initiator is used in an amount of 0.2 to 30 weight parts, based on 100 weight parts of said copolymer.

2. The method of claim 1, wherein vapor pressure of said radical polymerizable compound is not less than 50 mmHg.

3. The method of claim 1, wherein said radical polymerizable compound is an ethylenically unsaturated monomer selected from the group consisting of aromatic vinyl compound, alkyl acrylate, alkyl methacrylate, acrylonitrile, methacrylonitrile, vinyl carboxylic acid, butadiene and mixtures thereof.

4. The method of claim 3, wherein said ethylenically unsaturated monomer contains at least 5% by weight of said aromatic vinyl compound.

5. The method of claim 1, wherein the degree of polymerization exceeds 10%.

6. The method of claim 1, wherein said polyphenylene ether has a molecular weight of between 1,200 and 200,000.

7. The method of claim 1, wherein said polyphenylene ether is a poly-2, 6-dimethylphenylene-1, 4-ether.

8. The method of claim 1, wherein said initiator is used in an amount of from 0.5 to 20 weight parts.

9. The method of claim 1, wherein said compound has a vapor pressure of 100 mmHg or more.

10. The method of claim 1, wherein said radical polymerizable compound is used in an amount of from 10 to 90 weight parts.

11. The method of claim 10, wherein said compound is in an amount of 10 to 75 weight parts.

12. The method of claim 1, wherein said temperature is from 60° to 100° C.

13. The method of claim 1, wherein said molecular weight is between 3,000 and 100,000.

14. The method of claim 13, wherein said molecular weight is between 9,600 and 70,000.

15. The method of claim 1, wherein said initiator is selected from the group consisting t-butylhydroperoxide, cumene hydroperoxide, methylethylketone peroxide, di-t-butyl peroxide, dicumyl peroxide, acetyl peroxide, lauroyl peroxide, benzoyl peroxide, t-butyl peroxyacetate, t-butyl peroxybenzoate, alpha,alpha'-azobisisobutylonitrile, potassium persulfate, ammonium persulfate and mixtures thereof.

16. The method of claim 1, wherein said polyphenylene ether is selected from the group consisting of poly(2,6-dimethylphenylene-1; 4-ether); poly(2,6-diethylphenylene-1, 4-ether); poly(2-methyl-6-allyl-phenylene-1, 4-ether); poly(2,6-dipropylphenylene-1, 4-ether); poly(2,6-dimethoxyphenylene-1,4-ether); poly(2-methyl-6-chlorophenylene-1, 4-ether); poly(2-methyl-6-bromophenylene-1, 4-ether); poly(2,5-dimethylphenylene-1,4-ether); poly(2,6-phenylphenylene-1,4-ether) and copolymers thereof.

17. In a method of graft copolymerizing polyphenylene ether with a radical polymerizable compound, wherein a radical polymerization initiator is used to pretreat said polyphenylene ether prior to contacting with said radical polymerizable compound, and then the polyphenylene ether and radical polymerizable compound are graft polymerized, the improvement wherein said polyphenylene ether with pretreated initiator is of solid phase and heated to polymerization temperature, and said radical polymerizable compound is in gaseous phase and separately and previously heated to said polymerization temperature, and wherein said heated gaseous phase polymerizable compound is then introduced into a reactor having said polyphenylene ether with pretreated initiator, whereby said compound and said polyphenylene ether are graft copolymerized.

* * * * *